Jan. 24, 1967  W. E. HERZOG  3,300,740
A.C. RIPPLE AND NOISE REDUCTION WITHOUT
INCREASING CURRENT DRAIN
Filed July 8, 1963

INVENTOR.
WILLIAM E. HERZOG
BY
ATTORNEY 3,300,740
A.C. RIPPLE AND NOISE REDUCTION WITHOUT INCREASING CURRENT DRAIN
William E. Herzog, Cedar Rapids, Iowa, assignor to Collins Radio Company, Cedar Rapids, Iowa, a corporation of Iowa
Filed July 8, 1963, Ser. No. 293,445
1 Claim. (Cl. 333—79)

This invention relates in general to a circuit for eliminating alternating current ripple and noise.

It is an object of the present invention to reduce alternating components supplied to a load.

Another object is to eliminate alternating current ripples.

Yet another object is to eliminate noise components in an electronic circuit.

A feature of this invention is found in the provision for a substantially one-to-one turn ratio transformer connected in series with a load and a direct current source with one side of the primary of the transformer connected electrically to the secondary.

Further features, objects, and advantages of this invention will become apparent from the following description and claims when read in view of the drawings in which:

Figure 1:
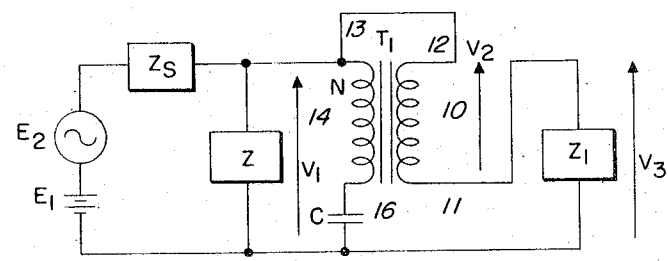
FIGURE 1 illustrates a circuit according to this invention.

FIGURE 1 illustrates a direct current voltage source $E_1$ which is connected in series with an alternating source $E_2$. A load $Z_1$ has one side connected to the direct source $E_1$, and the other side is connected to one end 11 of the secondary 10 of a transformer $T_1$. The other end 12 of the secondary 10 is connected to the first end 13 of the primary 14 of the transformer $T_1$. The other end 16 of the primary is connected to a capacitor C which has its opposite side connected to the direct current source $E_1$. A series impedance $Z_s$ is connected between the primary and the alternating current source. A parallel impedance Z is connected across capacitor C and the primary of the transformer. The impedance Z may or may not be present.

The transformer $T_1$ reduces the energy delivered from the alternating current source $E_2$ to the load $Z_1$ to a minimum while allowing energy from the direct current source $E_1$ to be delivered to the load $Z_1$. The transformer $T_1$ functions to reduce the alternating current voltage $V_3$ developing across the load $Z_1$ due to an input voltage $V_1$ caused by $E_1$, by developing a voltage $V_2$ across the secondary 10 of the transformer which is so polarized as to subtract from voltage $V_1$. When the turns ratio N of the transformer is equal to one, $V_1$ equals $V_2$, thus causing $V_3$ to be at a minimum. $V_3$ could be zero if the transformer is ideal and if the capacitance C is negligible.

As a practical matter, $V_3$ can be made as small as desired within the limitations of transformer design. The transformer must have a frequency response which includes a range of $E_2$, and handle the alternating current power commensurate with $E_2$ while carrying the direct current load current in its secondary without saturating its core or overheating. There are several ways of compensating for transformer deficiencies, such as "tuning" for higher frequency responses (resonating the transformer with capacitors), or varying the turns ratio and connecting a resistor in series with the primary or in shunt with the secondary. These schemes can be used to give good balance at certain frequencies with the transformer.

Figure 2:
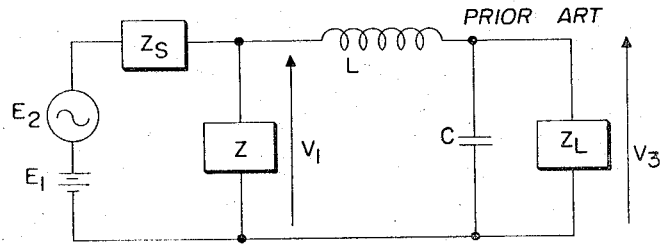
FIGURE 2 illustrates a conventional noise reducing circuit.

FIGURE 2 illustrates a conventional way of reducing alternating current components in a load. In such a circuit the alternating current components are reduced by the LC filter. The inductance has a high impedance to alternating current fluctuations, and the capacitor has a low impedance to high frequency fluctuations such that alternating current components in the load $Z_1$ are minimized.

Figure 3:
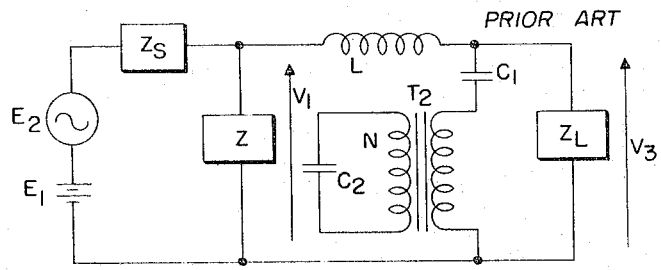
FIGURE 3 illustrates a second conventional noise reducing circuit.

FIGURE 3 illustrates another conventional wave reducing circuit.

The advantages of the circuits shown in FIGURE 1 are:

(1) It offers the possibility of virtually perfect cancellation of $E_2$, whereas both the standard circuits, FIGURES 2 and 3, can never achieve this, even in their theoretical limits.

(2) It offers the possibility of achieving the advantages of the circuit of FIGURE 3 over the conventional standard LC circuit, FIGURE 2, which is the multiplication of capacity, but without requiring a second D.C. blocking capacitor ($C_1$ in FIGURE 3). The transformer may serve as the inductor, eliminating the need for a separate one (L of FIGURE 3). Also note that only one fourth as much of the transformer's leakage reactance acts to lessen the capacitor's effectiveness. In FIGURE 1, N can be varied to fully utilize the D.C. and A.C. ratings of capacitor C with various magnitudes of D.C. and A.C. source voltages to get an optimum usage of the capacitor. If desired, T could be an autotransformer or considered as a top on the conventional choke of FIGURE 2.

Although it has been changed with respect to preferred embodiments thereof, it is not to be so limited, as changes and modifications may be made therein which are within the full intended scope of the invention as defined by the appended claim.

I claim:

A means for removing alternating current ripple and noise from a circuit comprising a direct current source, an undesired noise and ripple source in circuit with the direct current source, a series impedance connected to the sources, a transformer with a first side of its primary connected to the series impedance, a condenser connected to the other side of the primary and to the other side of the noise source and the direct current source, a first side of the secondary of the transformer connected to the first side of the primary, a load connected to the second side of the secondary, the other side of the load connected to the noise source and the direct current sources, and a parallel impedance connected across the primary of the transformer and the capacitor.

References Cited by the Examiner
UNITED STATES PATENTS
3,117,292  1/1964  Bixby _____ 333—79

ELI LIEBERMAN, *Primary Examiner.*